March 29, 1955  C. JOHNSON  2,704,956
CONTOURING CONTROL MECHANISM
Filed April 26, 1948  2 Sheets-Sheet 1
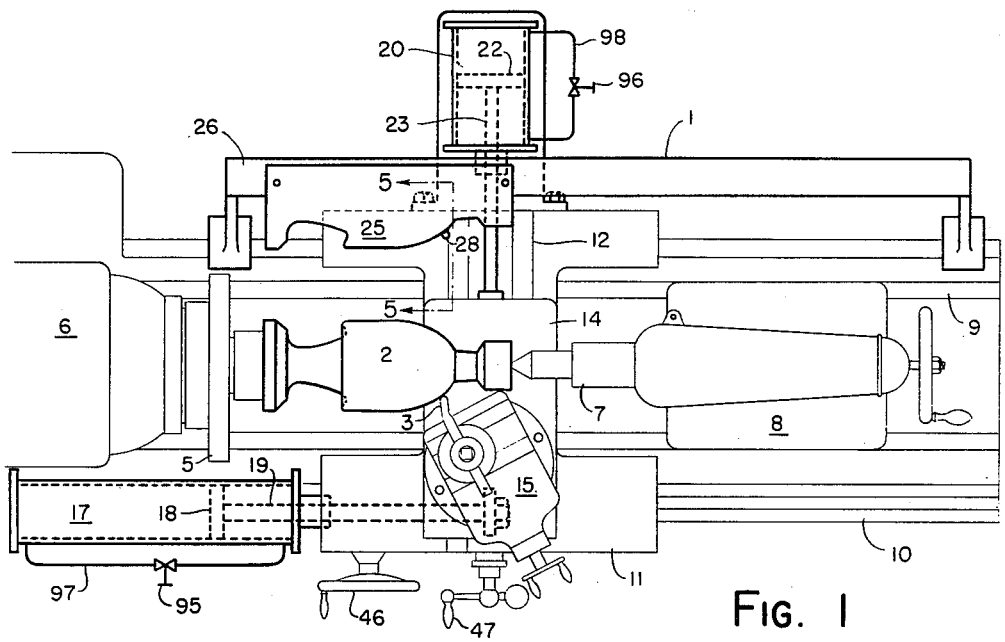
FIG. 1
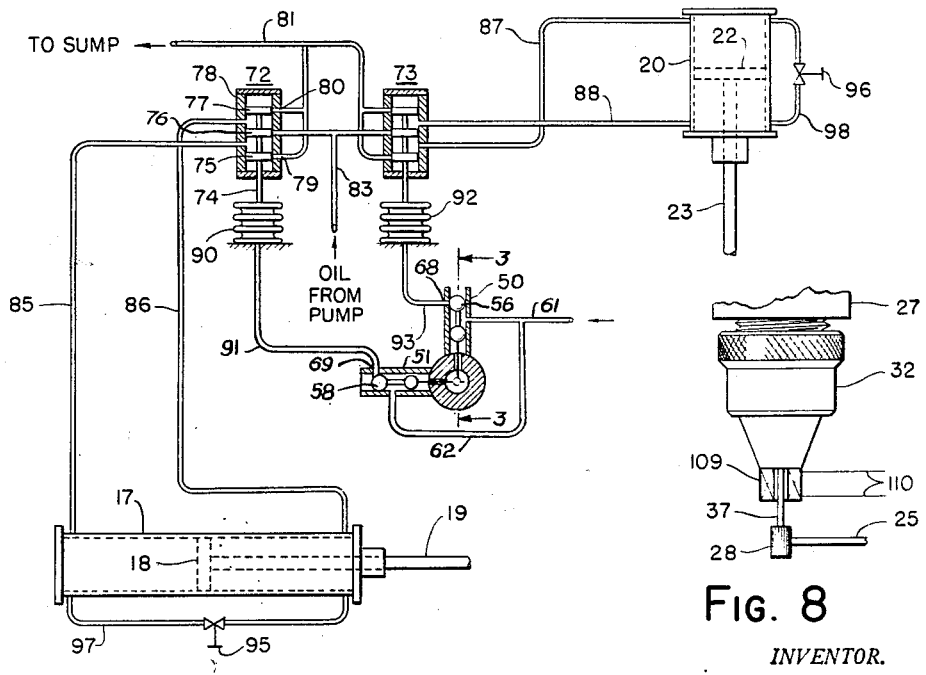
FIG. 2
FIG. 8
INVENTOR.
CLARENCE JOHNSON
BY Ralph C. Dustin
ATTORNEY March 29, 1955
C. JOHNSON
2,704,956
CONTOURING CONTROL MECHANISM
Filed April 26, 1948
2 Sheets-Sheet 2
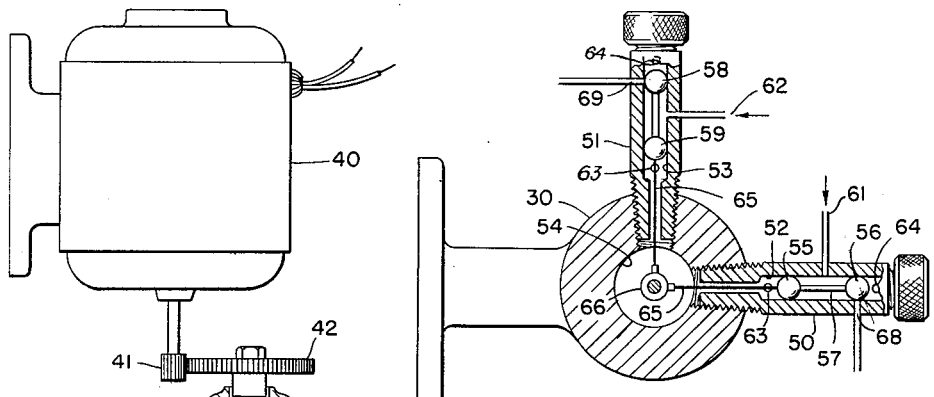
FIG. 4
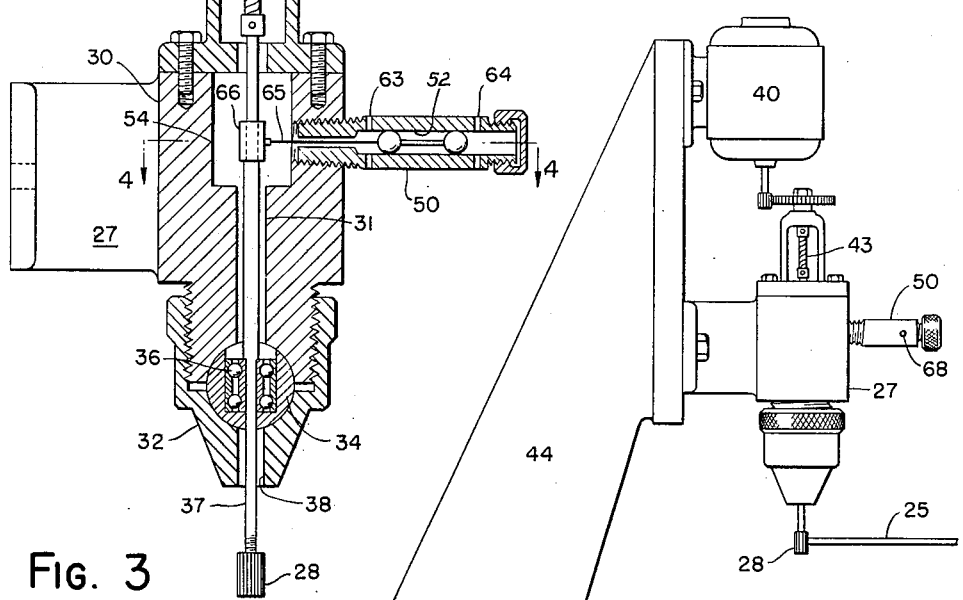
FIG. 3
FIG. 5
FIG. 7
FIG. 6
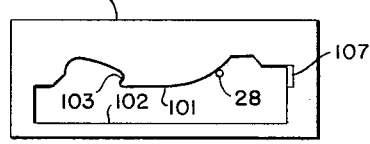
*INVENTOR.*
CLARENCE JOHNSON
BY Ralph C. Dustin
*ATTORNEY*

United States Patent Office 2,704,956
Patented Mar. 29, 1955

2,704,956

CONTOURING CONTROL MECHANISM

Clarence Johnson, Orfordville, Wis.

Application April 26, 1948, Serial No. 23,290

11 Claims. (Cl. 82—14)

This invention relates to machines for forming a profile on an object as determined by the shape of a templet, and more particularly to a machine having a cutting tool which is positioned relative to an object to be shaped by means operating in response to motions of a tracer cooperating with a templet.

As is well understood by those familiar with the art, in some machines such as lathes, a tool is moved longitudinally and transversely of a work piece which, except for rotation about its axis, remains stationary. In other machine tools, such as some types of milling machines, the work piece may be moved in two directions while the tool, except for rotation about its axis, remains stationary. In other types of milling machines, and usually in die sinking machines, the tool may be moved in one or more directions and the work piece may also be moved in one or more directions. In all instances, however, it is the relative movement between the tool and the work piece that causes the latter to be formed to a desired shape. Movement of the tool or work piece in different directions may be effected by supplying an operating fluid to motors under the control of valves which are actuated by a tracer cooperating with a stationary templet. In accordance with my invention, a tracer is supported both for rotation and pivoted movement at a point between its ends, and a magnetized head on the tracer is attracted to a templet of magnetic material for effecting a deflection of the tracer about its pivotal supporting means. By rotating the tracer while it is held against the templet, the tracer head tends to move along the templet and cause a deflection of the tracer in directions varying with the slope of the templet surface. The tracer thus becomes a true master, and the power driven machine elements become true slaves. The tracer condition is initially varied independently of all movements of the machine elements, and thus my tracer "leads" the movement of a lathe tool, for example, rather than "lagging" as has always been done in previous tracer control systems. In other words, my pattern and tracer control assembly controls all movements of a servomotor and independent of movements of the servomotor except for follow-up movements. Valve members may be connected to the tracer for actuation by the latter to supply fluid to motors which position the tool or work piece as well as the tracer supporting means in a direction to return the tracer to its normal position. If desired, the templet could be magnetized while the tracer head was made of a magnetic material.

An object of my invention is to provide an improved mechanism for controlling the operation of a machine to form a work piece in accordance with the contour or configuration of a template, pattern, sample, cam or the like. Another object is to provide an improved tracer mechanism for a profiling machine. Still another object is to provide a tracer which is operable to effect relative movement between a cutting tool and its work piece in any direction as determined by the shape of a template. Yet another object is to provide a tracer which is held in engagement with a templet by magnetic attraction and is rotated to effect its movement independent of all movement of the machine tool for controlling the supply of fluid to position a cutting tool relative to a work piece. The magnetic attraction is one example of many forms of attractile forces which relatively urges the tracer and templet together in all relative positions thereof. By rotating the tracer head, a rolling frictional drive between the templet and tracer is created, to thus alter the tracer condition, and the servomotor in the machine tool thus will follow the tracer.

A further object is to provide a pattern and tracer controlled machine tool wherein the tool cannot remove too much metal from the workpiece. In the ordinary "lagging" type of tracer controlled cross slide of a lathe, for example, the carriage is independently driven and the cross slide is dependently controlled by the tracer. In order to make the cross slide feed out, the tracer must actually be deflected from its neutral a given increment. Thus the tool is cutting too deeply by this given increment. In my invention of a "leading" type of tracer control, the tracer, when it strikes a feed-out portion of the templet, is directed, tilted, or pulled in this direction by its own independent drive means, and the tracer controls the servomotors of both the cross slide and the carriage in all their movements, which of course effect a follow-up movement between the tracer and the templet. Thus, it may be said that the tracer "leads" the tool, instead of "following" and actually directs all its movements, instead of attempting to correct for the erroneous increment of movements by which normal tracers "lag." Other objects will appear in the course of the following description.

In the accompanying drawings there are shown for purposes of illustration, several forms which my invention may assume in practice. In these drawings:

Fig. 1 is a plan view of an engine lathe having my invention associated therewith.

Fig. 2 is a schematic diagram of the control means employed in the embodiment of my invention shown in Fig. 1.

Fig. 3 is an enlarged sectional view of my improved tracer taken on the plane of the line 3—3 of Fig. 2.

Fig. 4 is a horizontal sectional view of the tracer and control valves taken on the plane of the line 4—4 of Fig. 3.

Fig. 5 is a view of the tracer and its supporting means, taken on the plane of the line 5—5 of Fig. 1.

Figs. 6 and 7 show different forms of templets for effecting travel of the tracer in a closed loop.

Fig. 8 shows a portion of the tracer having a coil associated therewith for providing a magnetic attraction between the tracer and the templet.

Referring to Fig. 1 it will be noted that I have shown my invention associated with an engine lathe 1 wherein a work piece 2, except for rotation about its axis, remains stationary, and a tool 3 is moved longitudinally and transversely thereof. It will be evident that my invention is applicable to other machine tools, and that when I speak of relative movement between the tool and work piece I include either an arrangement where the work piece is stationary and the tool is moved, or where the tool is stationary and the work piece is moved, or a combination of the two. As shown herein, a headstock 5 is adapted to be rotated by any suitable means, such as a motor 6, and a tailstock 7 is mounted on a carriage 8 movable longitudinally along the bed of the lathe in suitable ways 9. The work piece 2 is fixed at one end to the headstock and is rotatably supported at its other end by the tailstock. Also movable longitudinally along the bed of the lathe in suitable ways 10 is a carriage 11 having ways 12 in which a cross slide or carriage 14 is mounted for movement transversely of the lathe. Mounted upon the carriage 14 is an adjustable support 15 in which the tool 3 is secured.

Movements of the tool longitudinally of the lathe are produced by a hydraulic cylinder 17 fixed to the bed of the lathe and having a piston 18 connected to the carriage 11 by a piston rod 19. Transverse movements of the tool are produced by a hydraulic cylinder 20 fixed to the carriage 11 and having a piston 22 connected to the cross slide 14 by a piston rod 23.

A templet or cam 25 is rigidly held in parallelism to the work piece 2 upon a convenient extension 26 of the lathe bed. The profile of the templet adjacent the work piece determines the shaping of the latter, as will be shortly described. Mounted upon the cross slide 14, as shown in Fig. 5, is a tracer assembly 27 having a tracer head 28 engageable with the profile of the templet 25.

The tracer assembly, as shown in Fig. 3, includes a housing 30 having an opening 31 extending axially therethrough. Threaded upon a reduced portion of the housing is a cap 32, and formed in the adjacent portions of the cap and housing are recesses for receiving portions of a spherical shaped member 34. Formed in the member 34 is a bore providing a close fit for the outer race of a bearing 36. An elongated member or tracer arm 37 extends through the opening 31, the inner race of the bearing 36, and an opening 38 in the cap 32, and fixed to the lower end of the member 37 is the tracer head 28. The opening 31 provides a clearance about the member 37, and the spherical member 34 is supported between the housing 30 and the cap 32 for free angular movement in any direction. It will be seen that the member 37 is supported both for rotation and pivotal movement by the bearing and the member 34, and the clearance about the member 37 permits it to be moved angularly in any direction. The fit of the elongated member in the inner race of the bearing is sufficiently tight to hold it against movement longitudinally relative to the housing 30.

For rotating the member 37, there is provided a motor 40 having its drive shaft connected through gears 41, 42, and a flexible shaft 43 to the upper end of the member 37. As shown in Fig. 5, a bracket 44 is fixed to the cross slide 14 and supports the motor, the gears 41, 42, and the tracer housing for movement therewith. The tracer head 28 is magnetized and is made of a material which holds its magnetic strength for a long period of time. The member 37 is desirably made of a non-magnetic material so that it is not attracted to the tracer housing or any parts associated therewith, and the templet 25 is made of a magnetic material so that a magnetic attraction will exist between it and the tracer head. If desired, the templet may be magnetized while the tracer head is made of a magnetic material. In either case, the tracer head will be attracted to the templet as soon as it is moved within the range of the magnetic force. For moving the tracer manually toward the templet, there may be provided the usual gear mechanisms operable by hand controls 46 and 47, as shown in Fig. 1. When the tracer is moved to the vicinity of the templet, the magnetic attraction between them causes the tracer member 37 to be tilted about its pivotal support. The tilting of this member results in the actuation of means which will now be described, for effecting a positioning of the cutting tool.

Threaded within openings in the tracer housing and at right angles to each other, as shown in Figs. 3 and 4, are valve casings 50 and 51 having axial bores 52 and 53 opening into an enlarged bore 54 in the tracer housing surrounding the member 37. Received within the bore 52 is a valve member having lands 55 and 56 connected together by a stem 57. A similar valve member having lands 58 and 59 is received in the bore of the valve casing 51. The lands of both of the valve members fit loosely within the bores so that a small amount of air supplied through conduits 61 and 62 to the spaces between the lands escapes past the lands to the atmosphere through ports 63, 64. It will be seen that the action of the air on the lands is balanced, and that the slight flow of air past the lands results in a floating of the valve members so that negligible resistance is offered to their movements longitudinally of the bores. A flexible stem 65 is provided for connecting each of the valve members to a collar 66 supported on the tracer member 37 so that the latter rotates freely therein. The stems 65 may be made of wire which is sufficiently rigid to transmit forces for moving the valve member longitudinally of the valve casings and yet bend to permit a tilting of the member 37 in planes perpendicular to their axes. Formed in the valve casings 50 and 51 are ports 68 and 69 covered by the lands 56 and 58 when the tracer member 37 lies in the axis of the housing 30. It will be seen that a tilting of the member 37 in the plane in which Fig. 3 is shown will result in a positioning of the land 56 to connect the port 68 either in communication with the air supply conduit 61 or with the ports 64 opening to atmosphere. A tilting of the member 37 in a plane perpendicular to the plane of Fig. 3 will result in a connection of the port 69 either to the supply conduit 62 or to atmosphere through the ports 64. The lands 56 and 58 are so shaped to permit a predetermined flow of pressure fluid to the ports 68 and 69 when the lands and ports are centered relative to each other. A slight movement of these lands in one direction or the other results in a sharp increase or decrease in the pressure at the ports.

For supplying an operating liquid to the hydraulic cylinders 17 and 20, I have provided, as shown in Fig. 2, valve mechanisms 72 and 73 which are controlled by air pressure supplied from the valve casings 51 and 50, respectively. Each of these valve mechanisms includes a valve stem 74 carrying lands 75, 76 and 77 slidably received in the bore of a valve casing 78. The lands 75 and 77 control ports 79 and 80 communicating with a conduit 81 leading to a sump, not shown, and the land 76 controls a port communicating with a conduit 83 to which a liquid, such as oil, is supplied from a pump, not shown. Communicating with the bore of the valve 72 at opposite sides of the oil supply connection are conduits 85 and 86 which are connected to opposite ends of the hydraulic cylinder 17, and the bore of the valve 73 is connected by conduits 87 and 88 to opposite ends of the hydraulic cylinder 20. The stem of the valve 72 is connected to a bellows 90 which is connected in communication with the port 69 in the valve casing 51 by a conduit 91. A bellows 92 is connected to the stem of the valve 73 and communicates with a conduit 93 leading to the port 68 in the valve casing 50.

The operation of the mechanism described is as follows: The cutting tool 3 and the tracer assembly is first moved either manually by operation of the hand controls 46 and 47 or by a manual tilting of the tracer member 37 to supply oil to the cylinders 17 and 20, to positions where the tool is to start its cut on the work piece and the head 28 of the tracer is attracted to the templet at its right hand end. The magnetic attraction pulls the finger 28 over to the templet without movement of the tracer body 30, and thus the finger 28 may be stated to "lead" the body 30. The position of the finger 28 relative to the body 30 before movement of the finger may be considered as a first position, and a second position may be that established after the magnetic attraction has moved the finger 28. It will be noted that there is no need to provide any means for actuating the piston 18 independent of the tracer control. When the tool and tracer are positioned by the controls 46 and 47, valves 95 and 96 in by pass connections 97 and 98 for the hydraulic cylinders 17 and 20 are opened to permit the pistons to move freely in the cylinders. As soon as the head 28 of the tracer is attracted to the templet, the valves 95 and 96 are then closed so that the pistons in the cylinders may be actuated by the oil supplied thereto. Before cutting starts, the work piece is rotated by the motor 6, and the tracer member 37 is rotated by the motor 40 in a direction to cause it to travel from right to left along the templet. This would be a clockwise rotation, looking downward on the tracer. The combination of the magnetic attraction and the rotation of the tracer head will provide a rolling frictional engagement between the tracer and the templet, which will attempt to pull the tracer head along the scannable surface of the templet. The first effect of this pulling will be to tilt the tracer, and thus actuate the lands 56 or 58. It will be seen that movement of the tracer head along a portion of the templet extending parallel to the axis of the work piece will cause a tilting of the member 37 perpendicular to the plane of Fig. 3 to move the land 58 in a direction to connect the air supply line 62 to the port 69 for supplying air to the bellows 90. This bellows is expanded by the air and positions the lands 75, 76 and 77 for connecting the oil supply line 83 to the conduit 86 leading to the cylinder 17 at the right hand side of the piston 18, and connecting the left hand end of this cylinder through the conduit 85, the port 80, and the conduit 81 to the sump. The carriage 11 will then be moved to the left along the lathe bed by the dependently operated motor or cylinder 17. If the surface of the templet is perpendicular to the axis of the work piece, the tracer member 37 will be tilted in a direction to move the land 56 away from the port 68 in the valve casing 50 and effect either a supply or a venting of air relative to the bellows 92. If air is supplied to this bellows, the lands of the valve mechanism 73 are positioned to supply oil from the conduit 83 to the conduit 87 leading to the outer end of the cylinder 20 for moving the tool away from the work piece. A venting of air from the bellows 92 causes it to collapse and connect the oil supply conduit 83 to the conduit 88 for moving the tool toward the work piece. When the tracer head moves on an inclined surface as shown in Fig. 1, the member 37 is tilted to move both of the lands 58 and 56 for supplying air to the bellows 92 and exhausting air from the bellows 90 to actuate the valve mechanisms 72 and 73 to supply oil to the right hand end of the cylinder 17 and to the outer end of the cylinder 20. It will be appreciated that the bellows 90 collapses, as does the bellows 92, when connected to atmosphere for actuating the valve mechanisms 72 to supply oil to the left hand end of the cylinder 17 and vent oil from its right hand end.

For varying the speed at which the cutting tool is moved along the work piece, the speed of the motor 40 may be varied by suitable means to vary the rotating speed of the tracer head. It is also possible to replace the tracer head by one that is larger or smaller in diameter as needed to obtain the desired rate of travel. Since the valve members in the casings 50 and 51 do not require any force to position them, and since the tracer member 37 may be supported to tilt when only a very slight force is applied to its lower end, smooth surfaces on the tracer head and the templet are ordinarily sufficient to cause the tracer head to travel along the templet as it is rotated and effect the desired tilting. If necessary, the tracer head and the templet may be provided with roughened surfaces so that a better gripping action is obtained.

In Fig. 6 I have shown a templet 100 cut away to provide a surface 101 determining the shape of the work piece, and a surface 102 along which the tracer head moves for returning the cutting tool to a point for starting a cut on another work piece. It will be noted that I have shown the surface 101 shaped at 103 to cause the tool 3 to cut on reentrant angles. This is possible to some degree for certain shaped cutting tools when supported in the proper position.

Fig. 7 shows a templet 105 providing a surface at its periphery for determining the travel of the tracer head 28. It will be appreciated in this case that the tracer head must be rotated in a counterclockwise direction looking downward to effect its movement about the templet for positioning the tool 3. For returning the cutting tool to its starting position at a rapid speed, the speed of the motor 40 may be increased as soon as the cutting operation is completed. The speed of the motor may be regulated by suitable manually operable means or by means which is actuated automatically when the tool has completed its cut on the work piece.

It may be desirable when using the templets of Figs. 6 and 7 to stop the cutting tool when it is returned to the position for starting a cut on another work piece. In this case, a section 107 of the templet adjacent the point where the cutting is to start may be made of a non-magnetic material, such as hard rubber. When the tracer head 28 reaches the section 107, it will attempt to travel along the surface provided, but the magnetic attraction to the portion of the templet made of magnetic material will hold it against such movement. The pistons 18 and 22 will continue to position the cutting tool until the member 37 of the tracer is moved to its upright position. It will be appreciated that the section of non-magnetic material may be located at any point in the templet surface for stopping the operation of the feeding mechanism. When it is desired to start the feeding operation once more, it is only necessary to move the tracer head 28 manually across the section 107 to a point where it is attracted to the templet at the opposite side.

Instead of using a tracer head that is permanently magnetized, there may be provided an electromagnetic means for effecting an attraction between the tracer and the templet. In Fig. 8 I have shown a coil 109 supported by the cap 32 at the lower end of the tracer. The coil is provided with conductors 110 leading to a suitable source of electric energy for energizing it so as to provide a magnetic attraction between the tracer head and the templet. In this case, the tracer head and the member 37 may both be made of a magnetic material. If necessary, the casing of the tracer and parts associated therewith may be made of a non-magnetic material.

As a result of my invention there is provided an improved mechanism for positioning a tool relative to a work piece. Although I have shown valves positioned by the tracer to supply pressure fluid to means for actuating the hydraulic valves, it will be appreciated that the hydraulic valves may be connected directly to the tracer for actuation thereby.

While there have been described in this application several forms which my invention may assume in practice, it will be understood that it may be modified and embodied in various other forms without departing from its spirit or the scope of the appended claims.

What I claim as new, and desire to secure by Letters Patent of the United States, is:

1. In a machine tool having a tool movable relative to a work piece, and a servomotor mechanism for affecting powered transverse and longitudinal movement of said tool: a pattern, a relatively movable tracer follower assembly mounted for movement with said tool relative to said pattern and workpiece in response to operation of said servo-motor mechanism and including a stylus movably and rotatably mounted with respect to said tracer follower assembly and having a normal neutral position and movable in all angular directions to varying operating positions for controlling operation of said servomotor mechanism and thereby predetermining all movements of said tool; means connected to the stylus and responsive to rotation and movement of said stylus for effecting selective operation of said servo-motor mechanism; and separate motive means drivingly connected to said stylus for imparting relative tracer movement to said pattern and tracer stylus independently of said servo-motor mechanism.

2. A pattern-tracer control device for controlling the movement of a movable element having a servomotor for effecting powered movements of said element in all directions: a pattern formed of magnetic material; a tracer follower assembly mounted for relative movement with respect to said pattern and including a stylus having a normal neutral position, a magnetic pattern engaging portion and movable in all radial directions from said neutral position to varying positions for controlling operation of said servomotor and predetermining all of said powered movements; and independent motive means for driving said stylus along said pattern and effecting relative movement of said pattern and tracer stylus independently of the movement of said element; and servomotor control means responsive to said last mentioned movement of said pattern and tracer stylus for controlling operation of said servomotor whereby said element moves in all directions only in accordance with the independent movement of said stylus.

3. A pattern tracer control assembly having a tracer device and a template device adapted for cooperative engagement for controlling the relative movement between two members, one of which is supported for powered movement with respect to the other comprising a rotatable and tiltable tracer stylus having a multiplicity of actuating positions wherein said relative movement is effected and having a single position to establish a neutral condition wherein said relative movement is stopped; means mounting one of said devices for movement with said one of said members to effect follow-up movement of said device with respect to the other of said devices; cooperating means on the respective devices providing an attraction between said template device and said stylus except in one relative position of said devices to tilt said tracer stylus into cooperative relationship with said template device thus shifting said control assembly from the neutral to the actuating condition; and drive means for rotating said tracer stylus and effecting tracing movement of said tracer stylus relative to said template device until the attraction effected by said last mentioned means is disrupted upon said devices reaching said one relative position whereupon said one device, through said follow-up movement, restores the control assembly to neutral condition.

4. A cam and cam follower mechanism including a cam having a followable surface; a cam follower assembly movably supported and carrying a tiltable and rotatable stylus to trace said cam surface; a servomotor adapted to effect a follow-up movement between said cam and said cam follower assembly in accordance with the tracing movement between said cam and said stylus; means providing a force urging said stylus toward said cam in all relative positions thereof; and drive means, independent of any follow-up motion, adapted to rotate said rotatable stylus and effect said tracing movement with respect to said cam surface.

5. The combination of claim 4 wherein said means providing a force urging said stylus toward said cam comprises a cam and stylus made of magnetic material and a coil surrounding said stylus and electrically energized to provide a magnetic attraction between said cam and said stylus.

6. A pattern-tracer control system for a machine having at least a first movable member: comprising motive means providing movement to said first member; control means for said motive means; a templet; tracer mechanism including a movably mounted rotatable stylus for controlling operation of said motive means through said control means; cooperating means on the template and tracer providing an attractile force relatively urging together said stylus and said template; and a motor drivingly connected to said stylus and adapted to rotate said stylus for providing relative controlling movement between said stylus and said template.

7. In a control system for a machine tool having first and second movable members: and first and second servomotors for providing movement to said first and second members along two different paths, respectively, a templet; tracer mechanism for controlling said first and second servomotors including a tracer carried by one of said movable members for movement therewith and mounted for tracer movement with respect to said one movable member along any path presented by said template with movement therealong effecting simultaneous or independent controlled operation of said first and second servomotors; means adapting said templet and tracer mechanism for relative movement in accordance with the combined movements of said first and second members; and motor means independent of said motive means for providing tracing movement between said tracer and said template.

8. The combination of claim 6 wherein said control means comprises valve members connected to said stylus at points spaced angularly from each other and adapted to be actuated by said stylus upon movement thereof.

9. A tracer mechanism comprising a tracer support bracket; a tracer stylus movably and rotatably mounted upon said support bracket; a motor mounted on said support bracket adjacent said tracer body; a drive connection between said motor and said tracer stylus adapted to rotate said stylus in all positions of said stylus with respect to said bracket; and means connected to said tracer stylus and adapted upon movement of said tracer stylus to initiate operation of one or more motor control circuits selectively in response to the position of said stylus; and friction means connected with a portion of said stylus and adapted to frictionally engage the template and impart tracing movement to the tracer stylus in response to the rotation thereof.

10. In a machine tool comprising a tool mounted for relative movement to a workpiece support and independent feed mechanism for respectively advancing the tool longitudinally of the workpiece support and transversely in and out with respect to the workpiece support: a master control template and tracer mechanism operative to predetermine feed movements of said feed mechanisms comprising a magnetic template stationarily supported with respect to the workpiece support; a tracer assembly supported for movement with said tool and including a rigid magnetic tracer arm rotatably and pivotally mounted in said tracer assembly with a portion disposed in juxtaposition to said template whereby said portion will be magnetically attracted to said template causing said arm to pivot in a plane normal to the guiding edges of said template; means on said portion of said tracer arm providing a driving engagement with said template; means, including a flexible drive connection, for imparting rotation to said tracer arm in all positions of said arm whereby said arm portion, through said means providing driving engagement, will travel longitudinally of said template guiding edges causing said arm to pivot in a plane parallel to the guiding edges of said template; and feed mechanism control means connected to said arm at a point remote from said point of driving engagement with said template and responsive to the respective tilting movements of said arm to energize respectively said transverse feed mechanism to control the in and out feed of said tool and said longitudinal feed mechanism to control the advance feed of said tool.

11. A tracer mechanism comprising a tracer assembly, a rigid magnetic tracer arm rotatably and pivotally mounted in said tracer assembly with a portion disposed in tracing position and adapted to be magnetically attracted to a template causing said arm to pivot in a plane normal to and corresponding to the guiding edges of said template; means on a portion of said tracer arm providing a gripping contact; means, including a flexible drive connection, for imparting rotation to said tracer arm in all positions of said arm whereby said arm portion, through said means providing gripping contact, will travel longitudinally of a template guiding edges causing said arm to pivot in a plane parallel to the guiding edges of a template; and first and second control means connected to said arm at a point remote from said point of gripping contact and responsive to the respective tilting movements of said arm to actuate said controls.

References Cited in the file of this patent

UNITED STATES PATENTS

| | | |
|---|---|---|
| 2,025,081 | Anderson | Dec. 24, 1935 |
| 2,025,082 | Anderson | Dec. 24, 1935 |
| 2,154,718 | Bannon | Apr. 18, 1939 |
| 2,251,166 | Preis | July 29, 1941 |
| 2,276,755 | Anderson | Mar. 17, 1942 |
| 2,332,533 | Roehm | Oct. 26, 1943 |
| 2,388,376 | Young | Nov. 6, 1945 |
| 2,389,653 | Turchan et al. | Nov. 7, 1945 |
| 2,434,853 | Johnson | Jan. 20, 1948 |
| 2,436,373 | Barnes | Feb. 24, 1948 |
| 2,456,158 | Tancred | Dec. 14, 1948 |

FOREIGN PATENTS

| | | |
|---|---|---|
| 220,670 | Great Britain | Aug. 25, 1924 |